US011522465B1

(12) United States Patent
Schaffarra et al.

(10) Patent No.: US 11,522,465 B1
(45) Date of Patent: Dec. 6, 2022

(54) HIGH PRECISION POWER CONTROLLER

(71) Applicant: AES Global Holdings PTE Ltd., Singapore (SG)

(72) Inventors: Christian Schaffarra, Ruethen (DE); Michael Ostheim-Dzerowycz, Warstein (DE)

(73) Assignee: AES Global Holdings PTE Ltd., Singapore (SG)

( * ) Notice: Subject to any disclaimer, the term of this patent is extended or adjusted under 35 U.S.C. 154(b) by 0 days.

(21) Appl. No.: 17/445,365

(22) Filed: Aug. 18, 2021

(51) Int. Cl.
*H02M 5/293* (2006.01)
*H02M 1/00* (2006.01)

(52) U.S. Cl.
CPC ......... *H02M 5/293* (2013.01); *H02M 1/0058* (2021.05)

(58) Field of Classification Search
CPC .... H02M 5/275; H02M 5/293; H02M 5/2932; H02M 1/0045; H02M 1/0058
See application file for complete search history.

(56) References Cited

U.S. PATENT DOCUMENTS

2020/0106260 A1* 4/2020 Telefus ................. H02H 3/10
2020/0366079 A1* 11/2020 Telefus ................. H02M 1/096

OTHER PUBLICATIONS

"How to select the right thyristor (SCR) for your application"; STMicroelectronics; Mar. 2016; 26 pages.

* cited by examiner

*Primary Examiner* — Adolf D Berhane

(57) ABSTRACT

A power controller circuit comprises a controller and a bi-directional switching assembly coupled to a sensor configured to sense at least one energy parameter of an energy flowing through the bi-directional switching assembly. The bi-directional switching assembly comprises a controllable switch. The controller is configured to control the controllable switch into a conduction mode during a first portion of an energy cycle of electrical energy supplied to the bi-directional switching assembly to cause the energy to flow through the bi-directional switching assembly. Via the sensor, the controller monitors the at least one energy parameter of the energy flowing through the bi-directional switching assembly. The controller controls the first controllable switch into a non-conduction mode based on an amount of the at least one energy parameter of the energy flowing through the bi-directional switching assembly during the first portion.

20 Claims, 9 Drawing Sheets

US 11,522,465 B1

HIGH PRECISION POWER CONTROLLER

TECHNICAL FIELD

Aspects of the disclosure relate to power controllers and more particularly to cut-off control of power supplied to a load.

BACKGROUND

A power controller can be used to supply electrical energy to a load based on a percentage of an input voltage. Input currents and voltages supplied to the power controller by a power source are controllable by the power controller to transmit all of the input power to a load, none of the input power to the load, or a portion of the input power to the load. Applications for such power control include light dimmers, motor speed controllers, resistance heaters, chopper circuits, phase-control circuits, and the like.

OVERVIEW

In accordance with one aspect, a power controller circuit comprises a voltage input configured to receive electrical energy from a voltage source, a voltage output configured to transfer at least a portion of the electrical energy to the load, a bi-directional switching assembly coupled between the voltage input and the voltage output, and a sensor coupled to the bi-directional switching assembly and configured to sense at least one energy parameter of an energy flowing through the bi-directional switching assembly. The bi-directional switching assembly comprises a first controllable switch. The power controller circuit also comprises a controller configured to control the first controllable switch into a conduction mode during a first portion of an energy cycle of the electrical energy to cause the energy to flow through the bi-directional switching assembly, to monitor, via the sensor, the at least one energy parameter of the energy flowing through the bi-directional switching assembly during the first portion; and to control the first controllable switch into a non-conduction mode based on a first amount of the at least one energy parameter of the energy flowing through the bi-directional switching assembly during the first portion. The flow of the energy through the bi-directional switching assembly is halted during a second portion of the energy cycle in response to controlling the first controllable switch into the non-conduction mode.

In accordance with another aspect, a method comprises receiving electrical energy from a voltage source, the electrical energy comprising a first energy cycle. The method also comprises controlling a forward current switch of a switch assembly into an on-state during a forward current portion of the first energy cycle to transfer a first portion of the electrical energy to a load, monitoring a parameter of the electrical energy flowing through the switch assembly during the on-state of the forward current switch, and comparing an accumulated amount of the parameter during the on-state of the forward current switch with a threshold. In response to comparing the accumulated amount with the threshold, the method comprises controlling the forward current switch into an off-state during the forward current portion of the first energy cycle. In response to controlling the forward current switch into the off-state, the forward current portion is configured to prohibit the transfer of the first portion of the electrical energy to the load during a cut-off period of the forward current portion of the first energy cycle.

BRIEF DESCRIPTION OF THE DRAWINGS

The drawings illustrate embodiments presently contemplated for carrying out the invention.

In the drawings.

DETAILED DESCRIPTION

Figure 1:
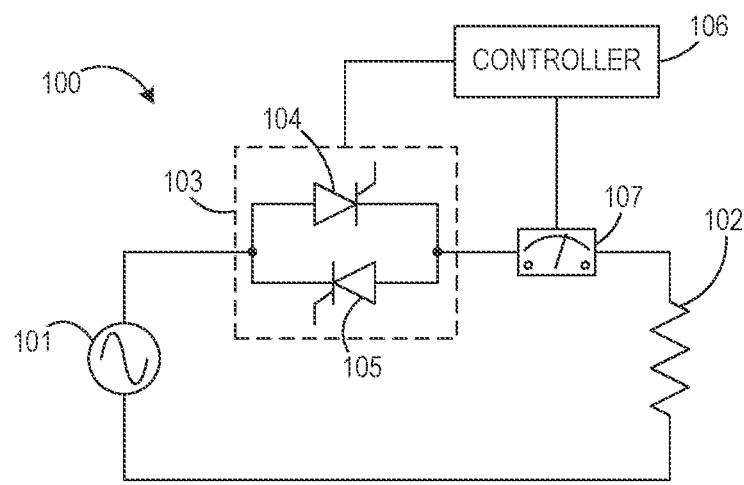
FIG. 1 is a power controller circuit for controlling input power according to a conventional implementation.

FIG. 1 illustrates a prior art power controller circuit 100 for controlling input power supplied by an input power source 101 to a load 102. In an example, the load 102 is a resistance heater having a heat output determined by a temperature set point. A switch assembly 103 having a pair of thyristors 104, 105 is coupled to a controller 106 for controlling the input power to provide the energy to the heater 102 to produce the desired temperature.

Figure 2:
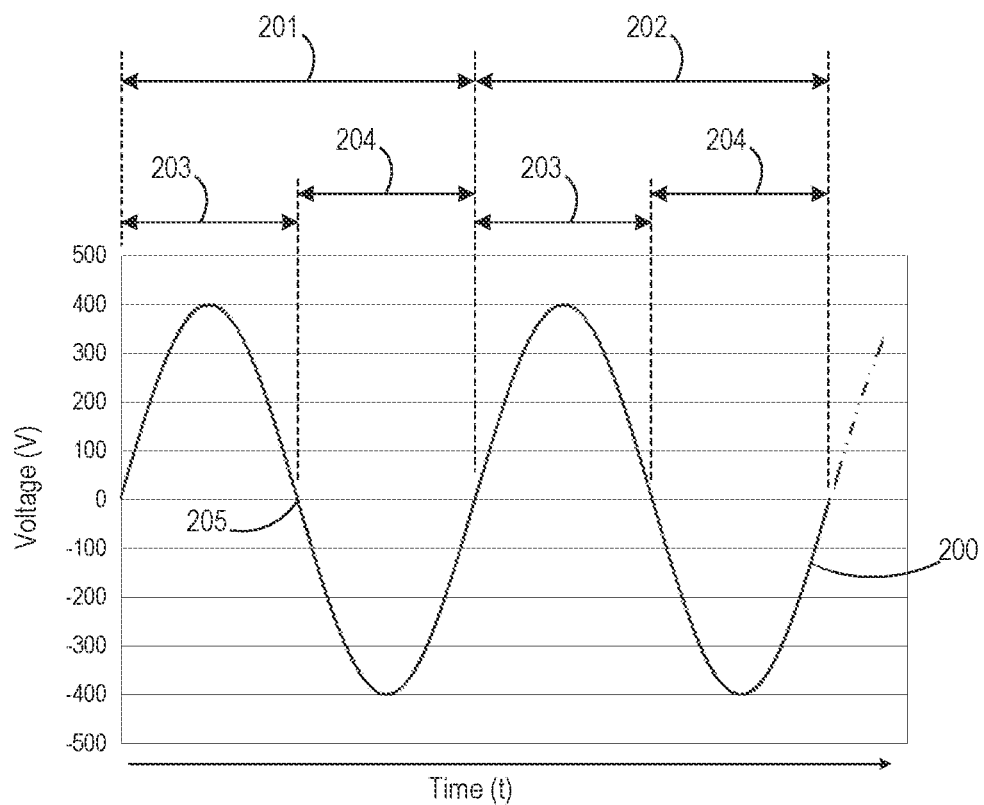
FIG. 2 is a graph illustrating an example input voltage.

FIG. 2 shows a graph illustrating an example input voltage 200 used throughout this disclosure as a reference input voltage. Input voltage 200 is an alternating current (AC) having a plurality of energy cycles 201, 202. While only two energy cycles 201, 202 are shown, it is understood that the input voltage 200 may continue beyond the time interval illustrated. Each energy cycle 201, 202 includes a first portion 203 of voltage in one polarity and a second portion 204 in another polarity. For example, the voltages in the first portions 203 are positive while the voltages in the second portions 204 are negative. A zero-cross point 205 is detectable between adjacent portions such as between the adjacent portions 203, 204 within a same energy cycle 201, 202 or between a second portion 204 of a first energy cycle 201 and a first portion 203 of a subsequent energy cycle 202. The zero-cross point 205 is detectable as a transition in the input voltage 200 between a positive voltage and a negative voltage and vice versa.

Figure 3:
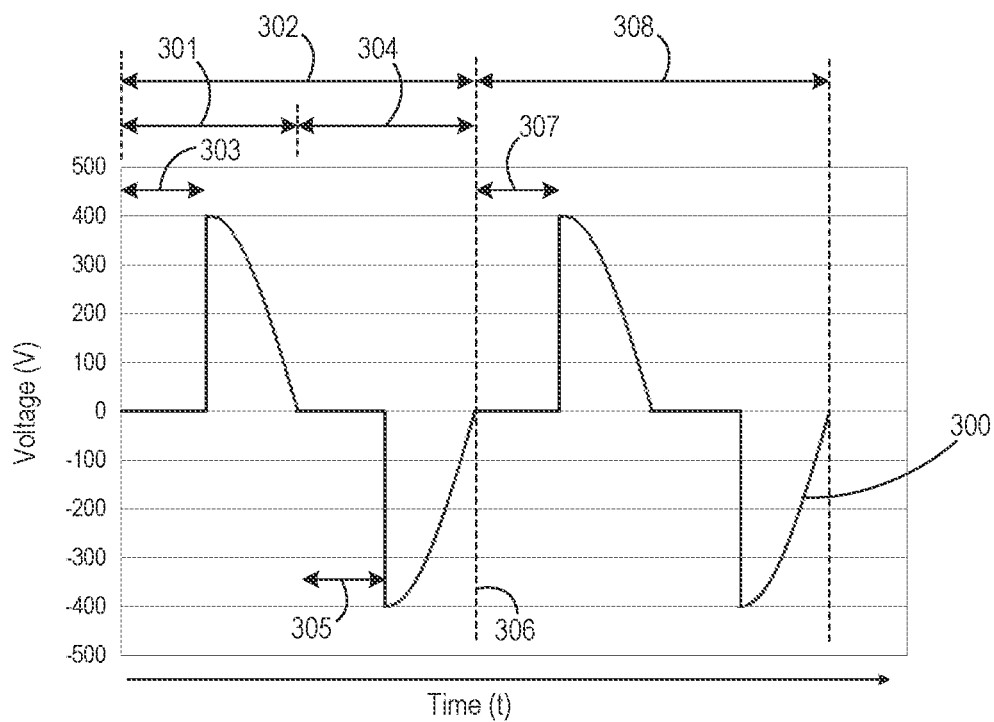
FIG. 3 illustrates a graph of an output voltage producible by the power controller circuit of FIG. 1 based on the input voltage of FIG. 2 in an example.

FIG. 3 illustrates a graph of an output voltage 300 producible by the power controller circuit 100 of FIG. 1 based on the input voltage 200 of FIG. 2 in an example. In a first portion 301 of a first energy cycle 302 of the output voltage 300, the controller 106 controls the forward- or positive-voltage thyristor 104 into a conduction mode starting at a first phase angle of the first energy cycle 302. A phase angle 303 close to 90 degrees is illustrated as an example. Once the conventional thyristor 104 has been switched on by a control signal from the controller 106, it remains latched in its on-state while a positive voltage potential is applied across its anode regardless of the value of the control signal. That is, the thyristor 104 can be turned on, but it cannot be turned off in the same controlled manner. As such, a voltage cut-on implementation is provided by the thyristor 104 where the input voltage 200 is blocked from the load 102 during the first portion 203 of the energy cycle 201 and is transmitted or allowed to pass during the subsequent portion of the first portion 203 of the energy cycle 201. In response to the input voltage 200 transitioning to the second portion 204 of the energy cycle 201 where the zero-cross point 205 has been passed and the input voltage is a negative voltage potential with respect to the thyristor 104, the thyristor 104 automatically shuts off. The reverse- or negative-voltage thyristor 105 is controlled into its on-state during the next portion 304 of the first energy cycle 302 by the controller 106 after a phase angle 305 often matching or substantially matching the phase angle 303 of the first portion 301.

During the first energy cycle 302, the controller 106 monitors and measures the accumulated power supplied by the switch assembly 103 using an energy sensor 107 (illustrated in FIG. 1). In one example, the controller 106 calculates the root-mean-square (RMS) value of the energy supplied to the load 102. At the end 306 of the first energy cycle 302, the measured RMS energy is compared with a threshold based on a desired set point, and the phase angle 307 of the following energy cycle 308 is calculated. For example, if the accumulated energy supplied by the switch assembly 103 during the first energy cycle 302 is more than the threshold, the phase angle 307 may be increased such that the thyristor 104 is turned on later in the second energy cycle 308 than in the first energy cycle 302. As a result of the larger phase angle 307, a lower amount of the input voltage 200 is transmitted by the switch assembly 103. Alternatively, the phase angle 307 can be shortened if the supplied energy is lower than the threshold. This will increase the amount of the input voltage 200 supplied during the second energy cycle 308.

Operation of the power controller circuit 100 according to the cut-on or "phase angle firing" scenario described above where cutting the energy off is not controllable causes the controller 106 to control the thyristors 104, 105 in a mode where the controller 106 assumes what the result of the RMS measurement will be at the end of a future energy cycle (e.g., energy cycles 302, 308, etc.). Based on the RMS energy measured during a previous energy cycle, the controller 106 can correct its assumption for the next energy cycle.

Figure 4:
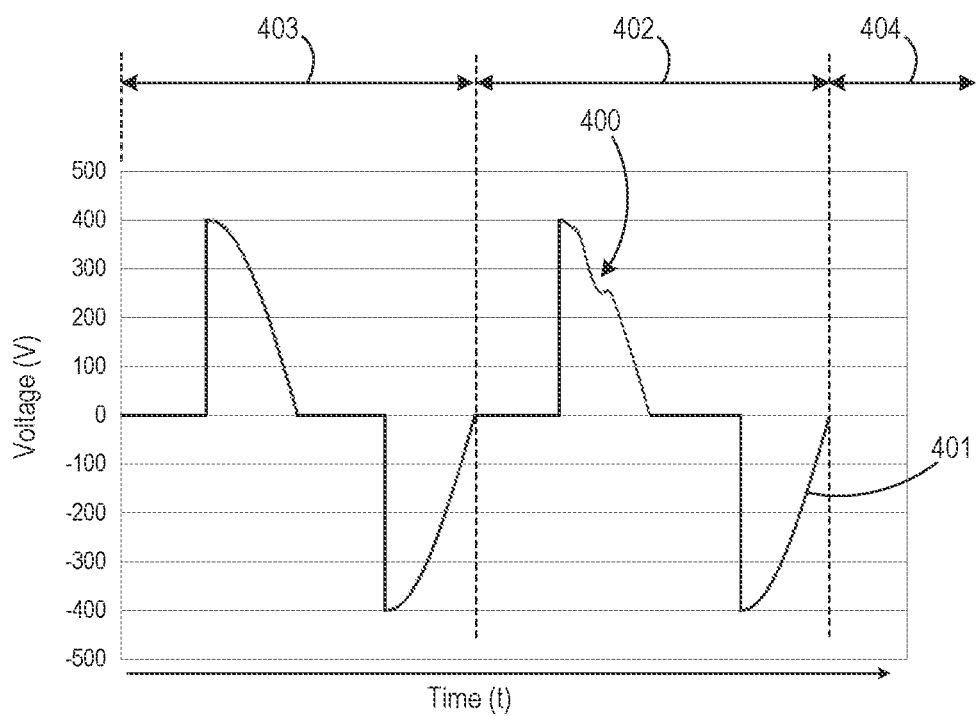
FIG. 4 illustrates a graph of an output voltage producible by the power controller circuit of FIG. 1 based on the input voltage of FIG. 2 having an anomaly in an example.

With an ideal input voltage 200 where no unexpected changes occur to the energy provided, adjustments to the controller's assumptions regarding the next cycle's energy output can be small. However, as illustrated in FIG. 4, a deviation 400 in the output voltage 401 caused by a corresponding deviation (not shown) in the input voltage 200 results in the total measured RMS energy supplied during the energy cycle 402 being lower than in the previous energy cycle 403. Accordingly, the calculation of the phase angle for the next energy cycle 404 will be expected to be lower than the phase angle for the energy cycle 402 in order to increase the supplied output voltage 401 toward the set point threshold. However, if the deviation 400 is not repeated in the energy cycle 404, the decreased phase angle can produce an amount of measured RMS energy during the energy cycle 404 that overshoots the set point threshold, causing at least a short period of phase angle oscillation as the controller 106 adjusts its assumptions of subsequent energy cycle voltage output. Such oscillations cause undesirable ripple in high-precision applications.

Figure 5:
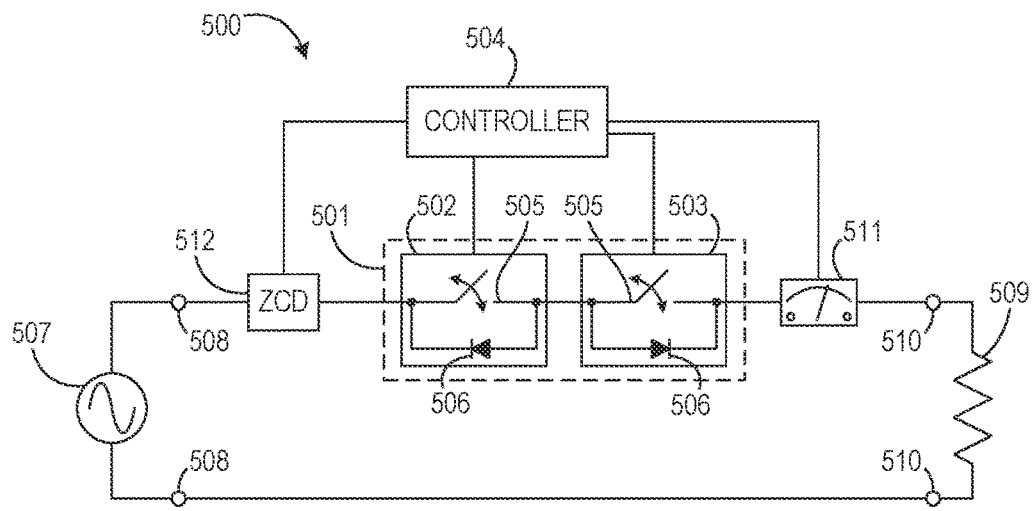
FIG. 5 illustrates a power controller circuit for controlling input power based on a cut-off operation according to an example.

FIG. 5 illustrates a power controller circuit 500 for controlling input power that overcomes the aforementioned drawbacks. The power controller circuit 500 includes a bi-directional cut-off switch assembly 501 having multiple controllable switches 502, 503 that are controllable by a controller 504 into a conduction mode and into a non-conduction mode. In the conduction mode, the respective switch 502, 503 is in an on-state capable of transmitting or passing electrical energy therethrough. In the non-conduction mode, the respective switch 502, 503 is in an off-state capable of prohibiting or cutting off the passage of electrical energy therethrough. In an example, each switch 502, 503 includes a controllable switch portion 505 and a diode 506. The diode 506 may be a distinct device or may be formed, for example, by a body diode of a metal-oxide-semiconductor field-effect transistor (MOSFET) device.

Figure 6:
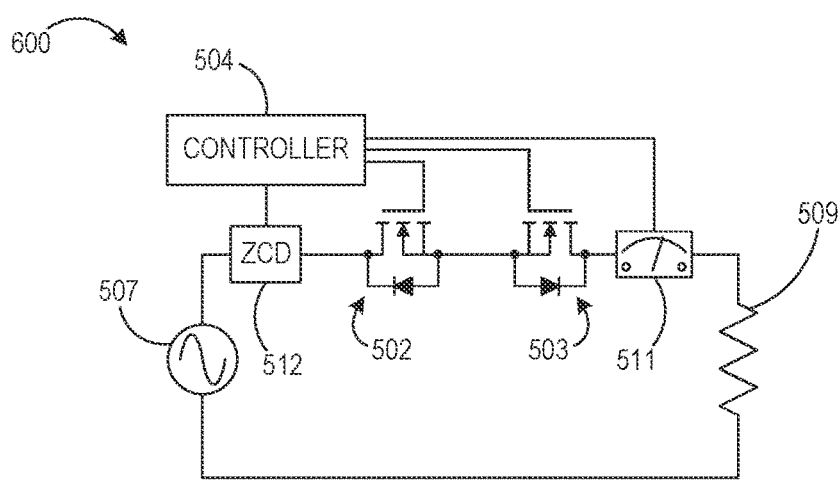
FIG. 6 illustrates a power controller circuit implementing the controllable switches of FIG. 5 as MOSFETs according to an example.
Figure 7:
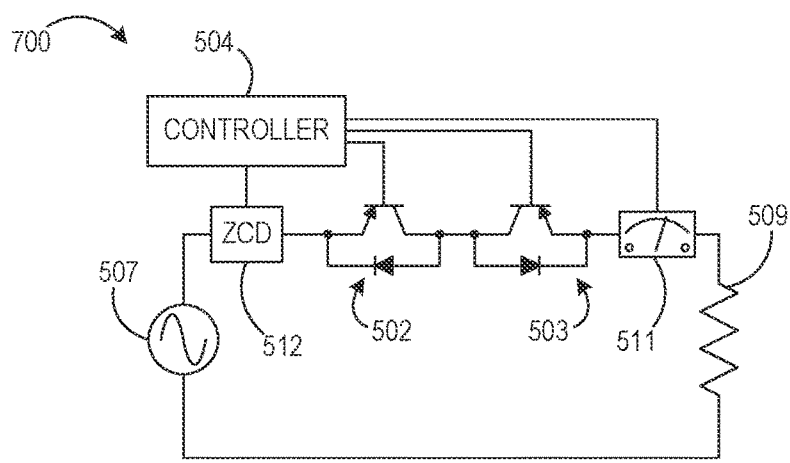
FIG. 7 illustrates a power controller circuit implementing the controllable switches of FIG. 5 as BJTs according to an example.

Electrical energy supplied to the switch assembly 501 is provided by a voltage source 507 to a voltage input 508 of the power controller circuit 500. The voltage source 507 may be, for example, a utility grid or other source capable of providing AC power to the power controller circuit 500 for delivery to a load 509 via a voltage output 510. Alternatively, the voltage source 507 may provide direct current (DC) electrical energy to the power controller circuit 500. While the switch assembly 501 includes at least a pair of switches 502, 503 arranged to block a portion of respective positive and negative aspects of the input energy from the voltage source 507, a single switch (e.g., switch 502 or switch 503) may be sufficient to block DC energy from the voltage source 507. FIG. 6 shows a power controller circuit 600 as a simplified example of the power controller circuit 500 illustrating the switches 502, 503 implemented as MOSFETs, while FIG. 7 shows a power controller circuit 700 as a simplified example of the power controller circuit 500 illustrating the switches 502, 503 implemented as bipolar junction transistors (BJTs). The MOSFETs may be silicon MOSFETs, silicon carbide MOSFETs, and the like. Other types of switches and topologies of switching elements single or plural capable of being controlled into both the conduction and non-conduction states are also contemplated herein.

Returning to FIG. 5, a zero-crossing detector 511 coupled to the controller 504 is configured to indicate a timing of the zero-cross point 205 in the input voltage 200. An energy sensor 512 is also coupled to the controller 504 for measuring accumulated energy during conduction states of the switches 502, 503.

Figure 8:
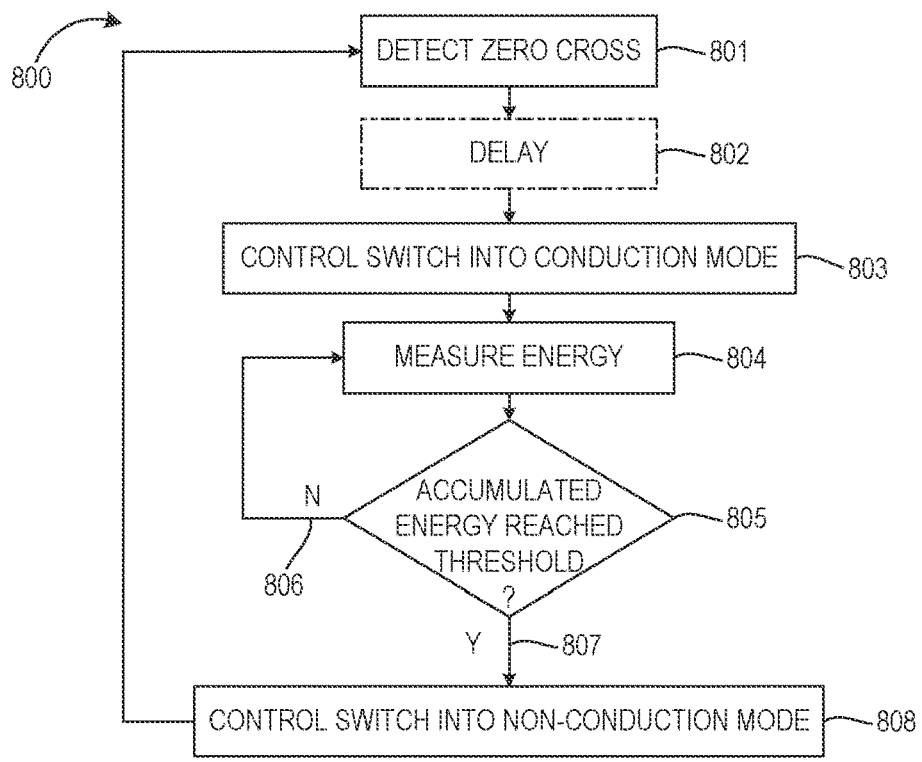
FIG. 8 illustrates a flowchart of a procedure executable by a controller for controlling the power controller circuit of FIG. 5 in a cut-off implementation according to an example.
Figure 9:
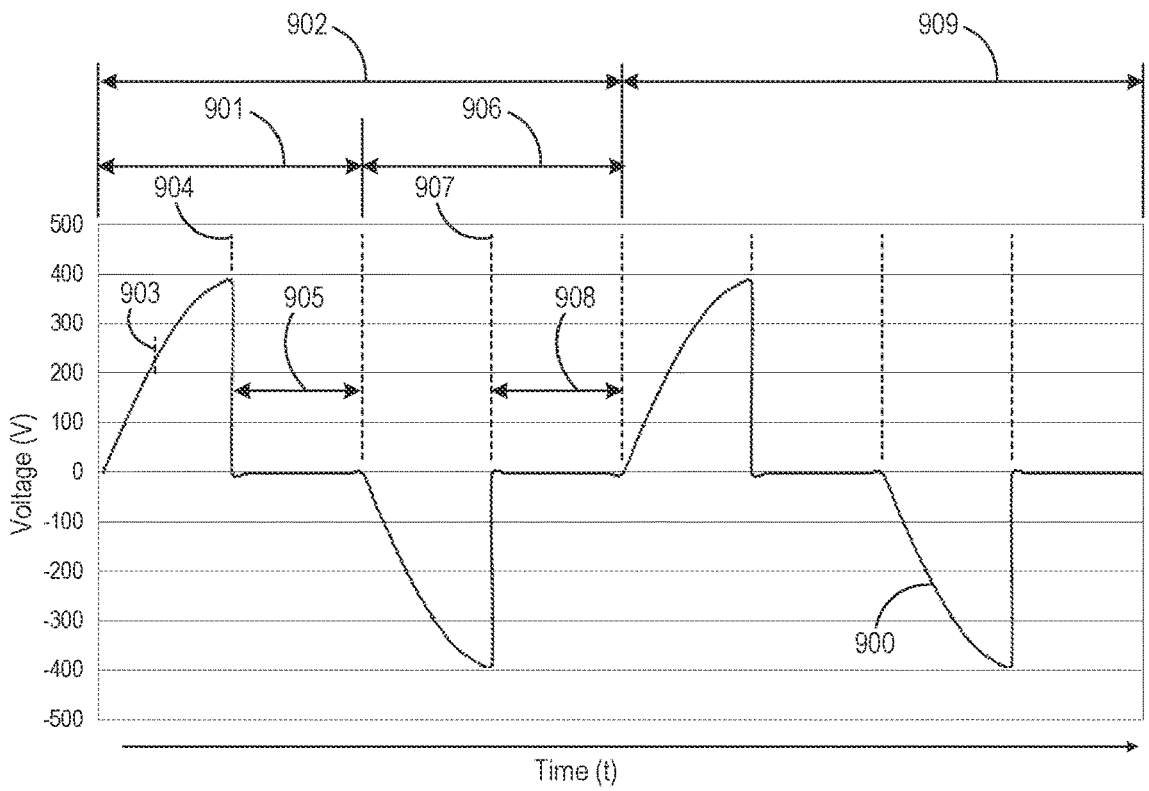
FIG. 9 illustrates a graph of an output voltage producible by the procedure of FIG. 8 according to an example.

FIG. 8 illustrates a flowchart of a procedure 800 executable by the controller 504 for controlling the power controller circuit 500 in a cut-off implementation according to an example. Referring to FIGS. 5, 8, and 9 and using the input voltage 200 of FIG. 2 as an example input voltage, an example output voltage 900 is shown during the operation of the power controller circuit 500. At step 801, the controller 504 waits until a zero-cross point 205 is detected by the zero-crossing detector 511. The zero-cross point 205 indicates that the next cycle is started and is available for transmission of the input energy through the switch assembly 501. In one embodiment, an optional delay 802 (shown in phantom) may be executed to postpone commanding the switch 502 into a conduction mode during the cycle as discussed with respect to FIG. 10 below. In response to detecting the zero-cross point 205, the controller 504 controls the positive-voltage switch 502 into a conduction mode or on state at step 803 in which the switch 502 transmits the input voltage 200 to the load 509 during a first portion 901 of a first energy cycle 902 of the output voltage 900. At step 804, the controller 504 measures an energy parameter of the output voltage 900 and accumulates a total amount of the energy parameter transmitted by the switch 502 during the first portion 901. The energy parameter measured may be the transmitted voltage, current, power, any indicator derived from the transmitted energy, or any combination thereof. Other parameters of the transmitted energy may also be measured and monitored.

At step 805, the total accumulated energy measured to the current time point is calculated by the controller 504 and compared with a threshold value. The controller 504 may, for example, calculate an RMS value of the total energy output so far by the switch 502 during the first portion 901. For example, at a first time point 903 of the first energy cycle 902, the controller 504 may calculate the RMS value of the total energy transmitted from the beginning of the first portion 901 and determine that the set-point threshold has not yet been met. Accordingly, additional energy should be transmitted to the load 509 during the first portion 901. If the threshold is not met 806, the procedure 800 returns to step 804 to measure the transmitted energy at a subsequent time point. Steps 804 and 805 may be repeated until the threshold value is met 807.

At a subsequent time point 904, the controller 504 may determine that the total accumulated energy transmitted by the switch 502 has met the set-point threshold. Accordingly, the controller 504 controls the switch 502 into a non-conduction mode or off state at step 808. The procedure 800 returns to step 801 to again wait for the next zero-cross point 205. While the controller 504 is waiting for the next zero-cross point 205, the output voltage 900 supplies very little or no additional energy to the load 509 during the remainder 905 of the first portion 901 of the first energy cycle 902.

The first portion 901 ends when a next zero-cross point 205 is detected at step 801, and a second portion 906 of the first energy cycle 902 begins by the controller 504 repeating steps 803-808 of the procedure 800 during the negative voltage portion of the first portion 203 of the input voltage 200. During the negative voltage portion, the controller 504 commands the second switch 503 into its conduction and non-conduction modes to deliver the input voltage 200 to the load 102 during the second portion 906 of the first energy cycle 902. As illustrated in FIG. 9, at a time point 907, the output voltage 900 transmitted to the load 509 during the second portion 906 of the first energy cycle 902 may be measured and accumulated by the controller 504 and determined to satisfy the set-point threshold. In response, the switch 503 is commanded into its non-conduction mode at step 808 for the remainder 908 of the second portion 906 of the first energy cycle 902. A second energy cycle 909 of the output voltage 900 follows the first energy cycle 902, and a repetition of the procedure 800 as described above is again performed by the controller 504.

A modification to the set-point threshold causes a corresponding modification to the time point 904 at which the transmitted energy is determined to have accumulated sufficiently to meet the threshold. For example, an increase in the set-point threshold will increase the conduction time of the respective switch 502, 503 and vice-versa. Accordingly, an increase in the set-point threshold will decrease the remainder 905 of the first portion 901 during which the switch 502 is in a non-conduction mode.

Figure 10:
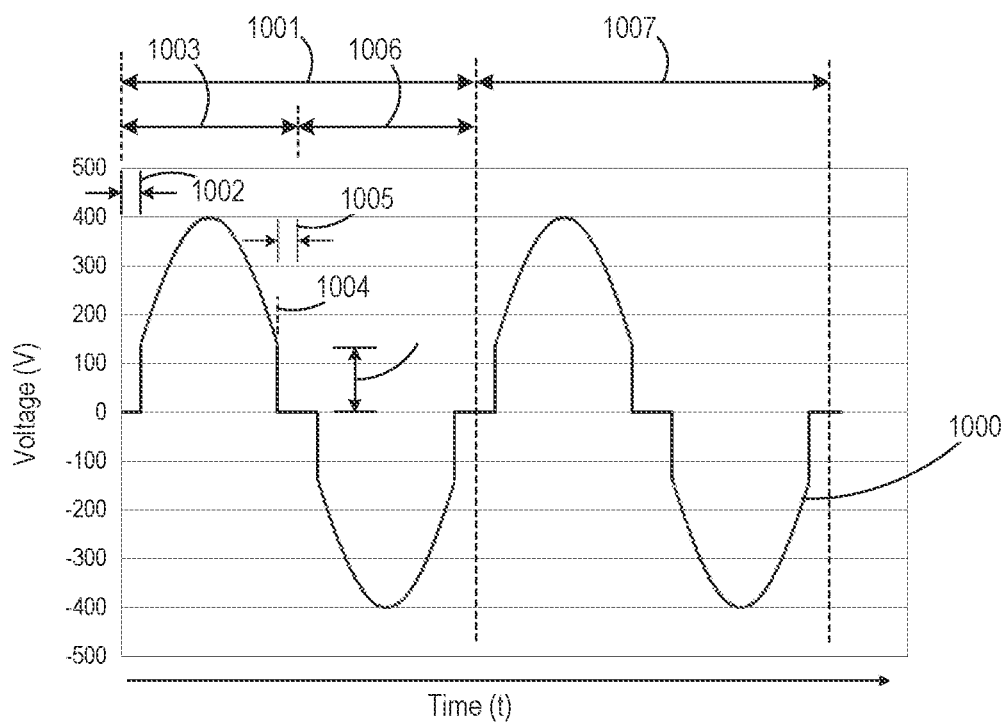
FIG. 10 illustrates a graph of an output voltage producible by the procedure of FIG. 8 in response to executing the optional delay step according to an example.

FIG. 10 illustrates an output voltage 1000 resulting from executing procedure 800 via 504 using the delay of step 802 according to an example. In response to detecting the zero-cross point 205 indicating the start of the first energy cycle 1001, the controller 504 waits for the period of delay (step 802) before controlling the positive-voltage switch 502 into the conduction mode at step 803. Incorporating the delay causes the switch 502 to begin transmitting the input voltage 200 to the load 509 after a delay period 1002 during a first portion 1003 of the first energy cycle 1001 of the output voltage 1000. In this manner, a cut-on boundary of the transmitted energy is defined. The controller 504 measures an energy parameter of the output voltage 1000 as described above, and in response to determining that the total accumulated energy transmitted by the switch 502 has met the set-point threshold at time point 1004, the controller 504 controls the switch 502 into a non-conduction mode (step 808) that defines a cut-off boundary. The procedure 800 returns to step 801 to again wait for the next zero-cross point 205. While the controller 504 is waiting for the next zero-cross point 205, the output voltage 1000 supplies very little or no additional energy to the load 509 during the remainder 1005 of the first portion 1003 of the first energy cycle 1001. During a second portion 1006 of the first energy cycle 1001 and during subsequent energy cycles 1007, the cut-off mode with cut-on delay discussed above with respect to the first portion 1003 may be repeated.

By implementing the delay period 1002 in a cut-off mode with cut-on delay, the amplitude of the energy transmitted through the switch(es) of the switch assembly 501 at the period of cut-off (e.g., at the cut-off time point 1004) can be lower than a cut-off mode such as illustrated in FIG. 9. Accordingly, undesired harmonics and component stress can be reduced compared with turning off the switch at a higher amplitude of voltage and/or current. While additional harmonics and/or stress may be experienced by the switch due to turning the switch on after the delay period when the amplitude of the energy is greater than if turned on sooner as illustrated in FIG. 9, the net generated harmonics and/or experienced stress of the cut-on/off mode may be preferred over the cut-off mode with no or very low cut-on delay.

The controller 504 may modify the delay period 1002 to shift the cut-on time forward or backward. For example, the controller 504 may increase or decrease the delay period 1002 to alter a difference between the cut-on and cut-off amplitudes of the energy if the delay shift would yield a reduction in net harmonics/stresses.

Figure 11:
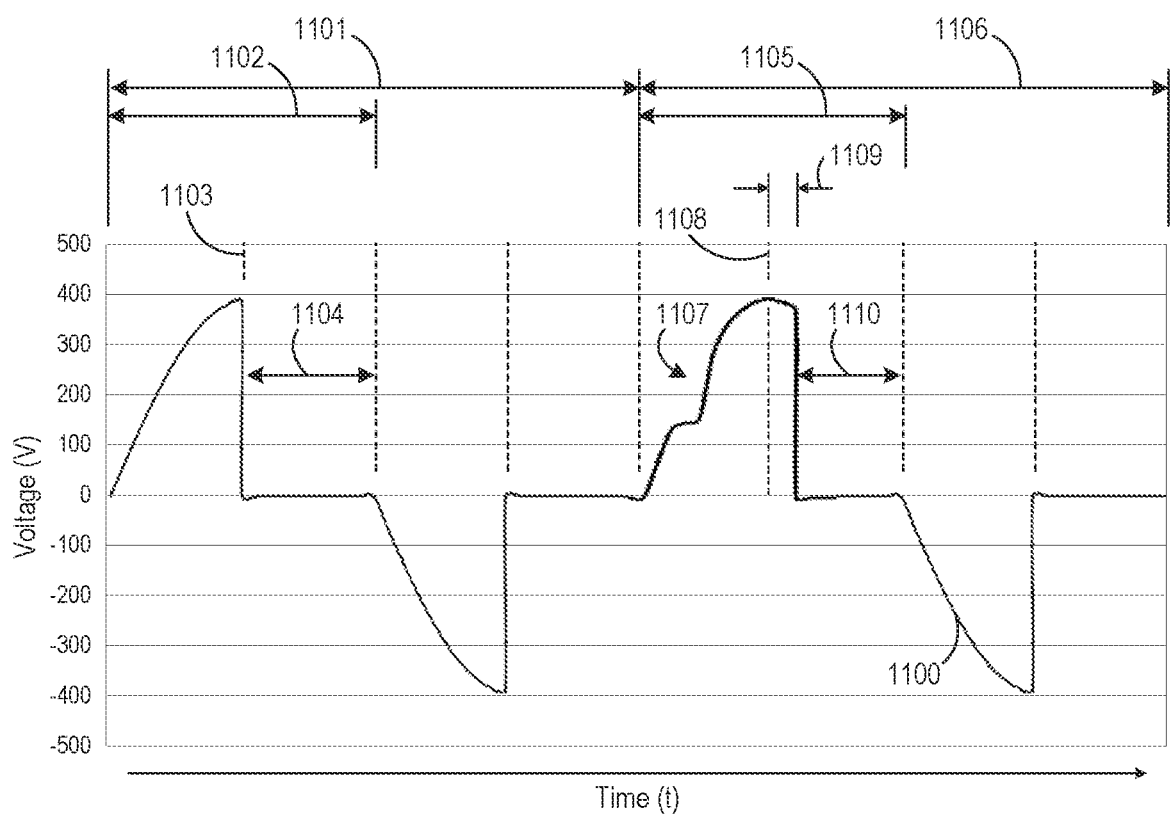
FIG. 11 illustrates a graph of an output voltage producible by the procedure of FIG. 8 that addresses an anomaly in the input voltage in an example.

A benefit of operating according to a cut-off mode as described above with respect to FIGS. 5-10 is the ability to measure the amount of energy transmitted to the load 509 while the energy is being transmitted. In contrast, the cut-on mode with no cut-off control requires the controller 504 to guess what the total amount of energy delivered to the load 509 will be ahead of time. An example of how the benefit is realized is illustrated in FIG. 11. An example output voltage 1100 is illustrated having a first energy cycle 1101 with output results similar to the first energy cycle 902 of the output voltage 900 of FIG. 9. That is, a stable input voltage 200 during the first portion 1102 of the first energy cycle 1101 yields a time point 1103 occurring at a similar time as the time point 904. Accordingly, the remainder 1104 of the first portion 1102 is also similar to the remainder 905.

During the first portion 1105 of a subsequent energy cycle 1106, however, an anomaly in the input voltage 200 is transmitted as a corresponding anomaly 1107 in the output voltage 1100. In the example illustrated, the anomaly 1107 includes a dip in the output voltage 1100. Accordingly, at a time point 1108 during the first portion 1105 in which a sufficient amount of accumulated energy would have been transmitted to the load 509 if the anomaly 1107 were not present, the accumulated energy at the time point 1108 is still less than the set-point threshold and is not enough to turn off the switch 502, yet. Instead, an additional amount of time 1109 is spend transmitting additional energy until the total accumulated energy transmitted during the first portion 1105 satisfies the threshold value. Since the on time of the switch 502 during the first portion 1105 of the subsequent energy cycle 1106 is greater than the on time of the switch 502 during the first portion 1102 of the first energy cycle 1101, the remainder 1110 of the first portion 1105 of the subsequent energy cycle 1106 is shorter than the remainder 1104 of the first portion 1102 of the first energy cycle 1101. In this manner, the accumulated energy transmitted during the first portion 1105 of the energy cycle 1106 can be controlled while monitoring and measuring the output voltage 1100 during the first portion 1105 in the cut-off mode and need not be guessed before-hand as would be required in a cut-on mode. The cut-off mode thus allows for high precision power control.

Figure 12:
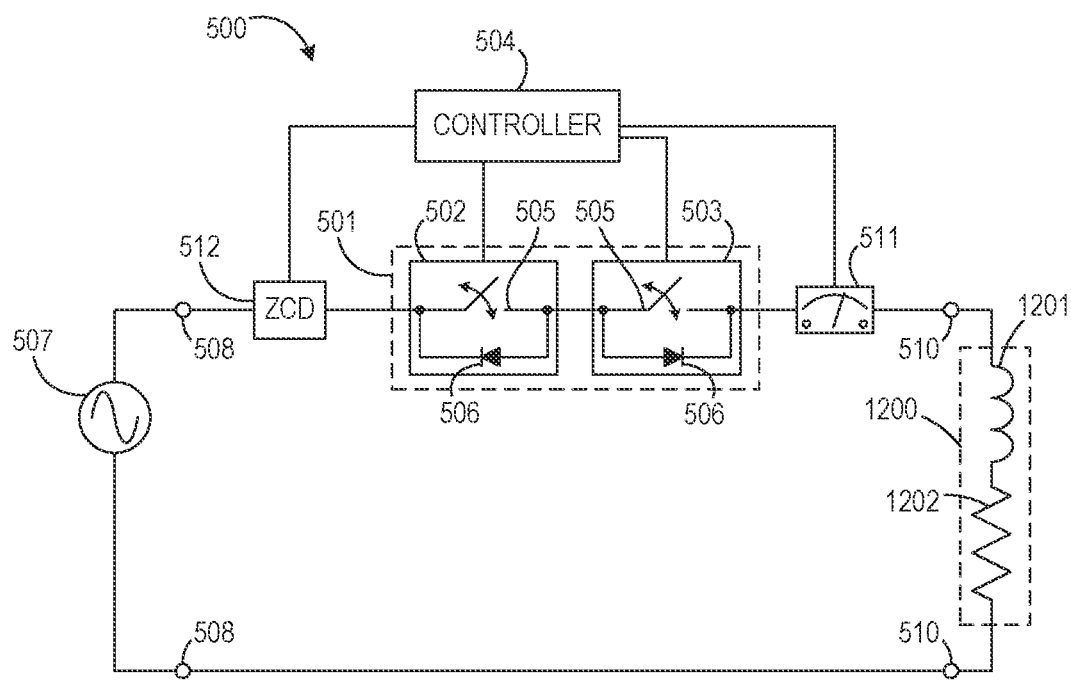
FIG. 12 illustrates a power controller circuit for controlling input power based on a cut-off operation and supplying the input power to a resistive/inductive load according to an example.
Figure 13:
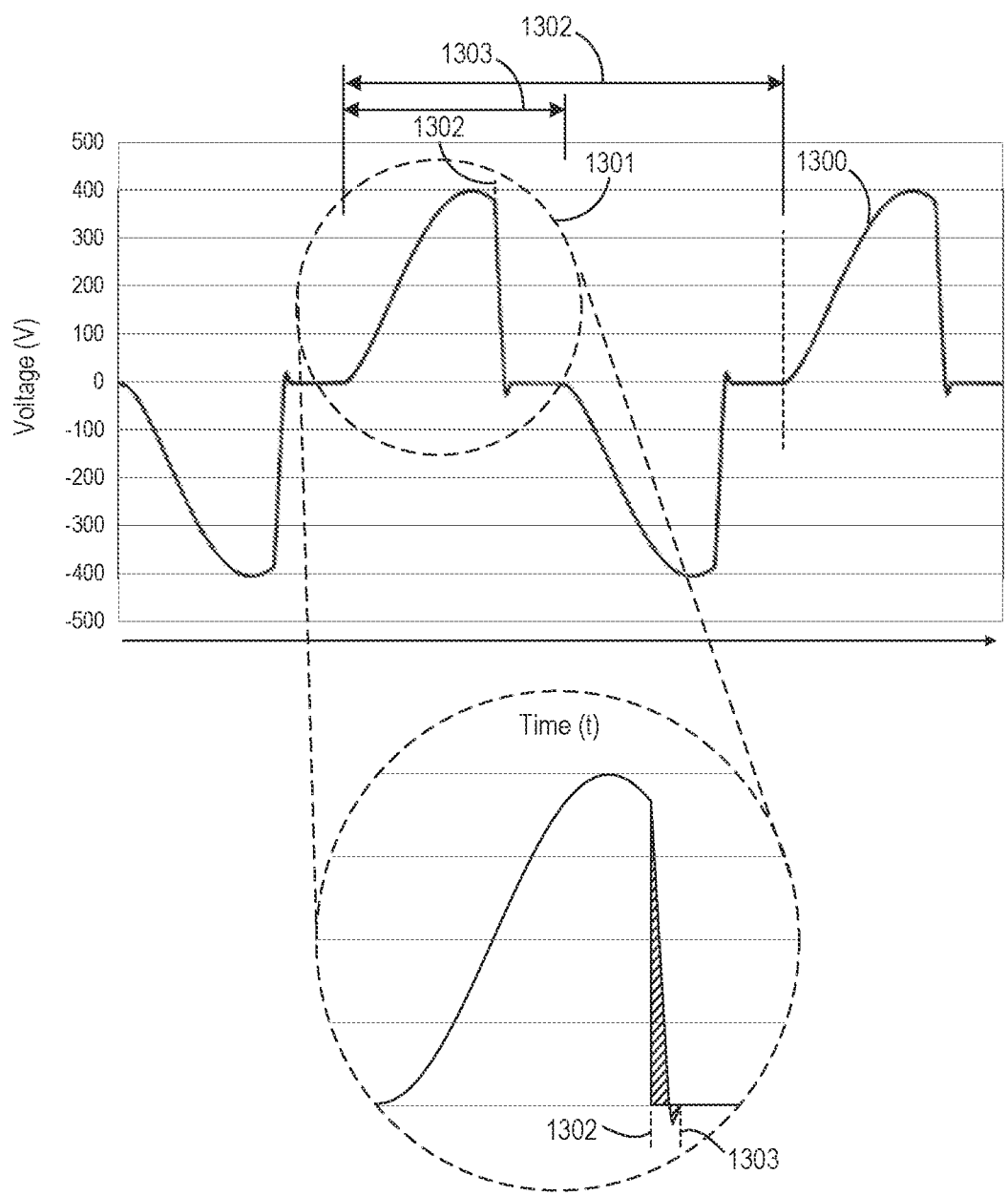
FIG. 13 illustrates a graph of an output voltage producible by the power controller circuit of FIG. 12 based on the input voltage of FIG. 2 in an example.

While the load 509 illustrated in FIG. 5 is shown as a resistive element, loads may include more than resistance properties. For example, FIG. 12 illustrates the power controller circuit 500 of FIG. 5 with a load 1200 that includes resistance and inductive properties. The resistance property is illustrated by resistance element 1201, and the inductance property is illustrated by inductive element 1202. With the load 1200 including an inductive property, the cessation of the transmission of energy by the switch assembly 501 to the load 1200 when the switches 502, 503 are turned off or commanded into their non-conduction modes is delayed. FIG. 13 illustrates output voltage 1300 showing a portion 1301 of the output voltage 1300 during a conduction mode of the switch 502 during a positive voltage portion of the input voltage 200 as an example. In executing the procedure 800 described herein, the controller 504 may measure at a time point 1302 that the accumulated energy transmitted by the switch assembly 501 has satisfied the set-point threshold. Accordingly, step 808 of the procedure 800 may be implemented to command the switch 502 into its non-conduction mode at the time point 1302. However, due to the inductive properties of the load 1200, the power transmitted by the switch assembly 501 is not sufficiently shut off until time point 1303, which causes additional energy to be transmitted to the load 1200 beyond what the controller 504 had calculated. Thus, the actual energy transmitted by the power controller circuit 500 to the load 102 may exceed the threshold each time one of the switches 502, 503 is turned off by at least the additional shut-off energy. An adjustment to the determination of when to command the switches 502, 503 into their off states may be implemented to account for the additional shut-off energy.

Figure 14:
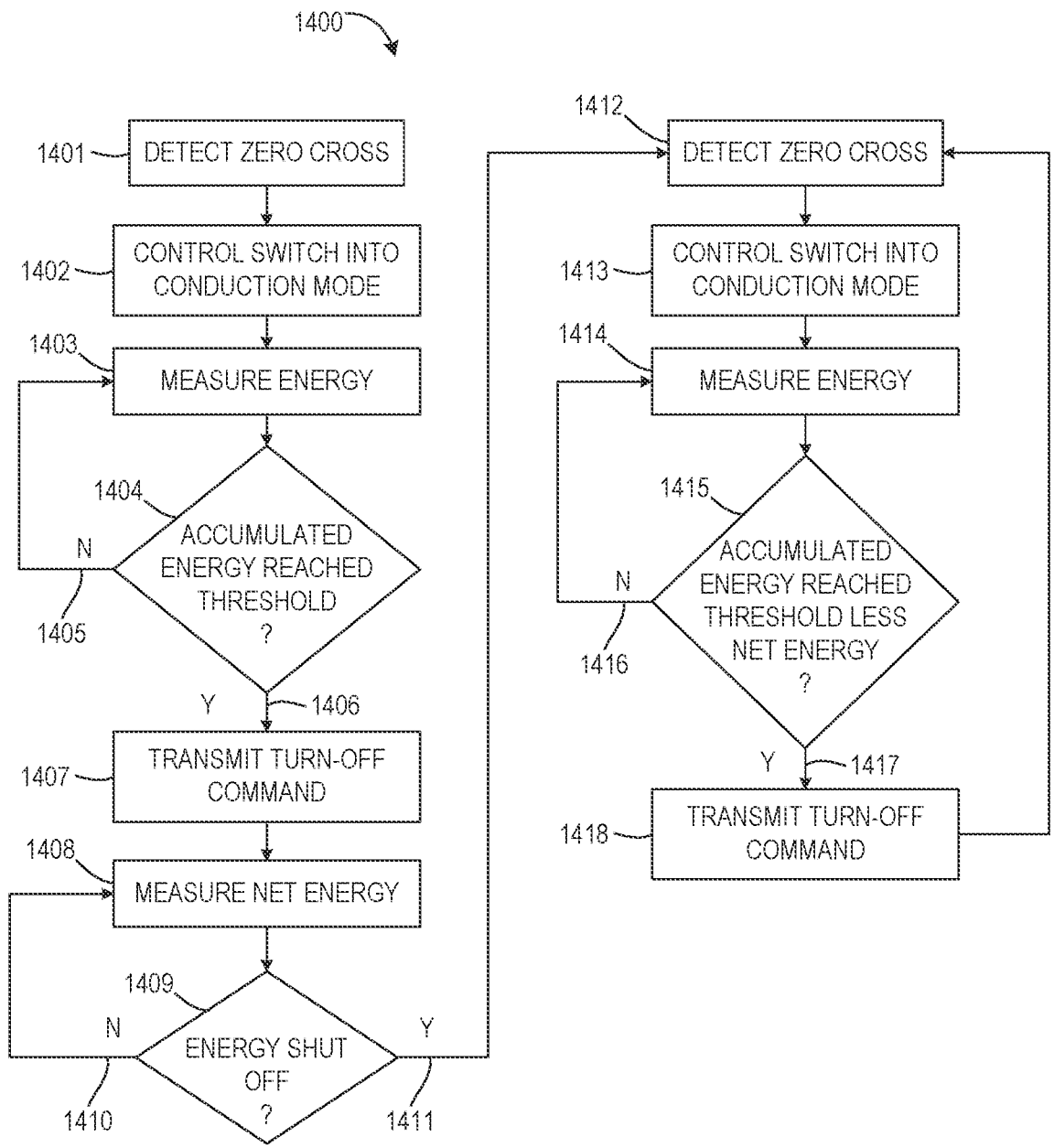
FIG. 14 illustrates a flowchart of a procedure executable by a controller for controlling the power controller circuit of FIG. 12 in a cut-off implementation according to an example.

FIG. 14 illustrates a procedure 1400 executable by the controller 504 for controlling the power controller circuit 500 in a cut-off implementation that takes the additional shut-off energy into account according to an example.

Referring to FIGS. 12-14 and using the input voltage 200 of FIG. 2 as an example input voltage, the controller 504 waits until a zero-cross point 205 is detected by the zero-crossing detector 511 at step 1401. In response to detecting the zero-cross point 205, the controller 504 controls the positive-voltage switch 502 into a conduction mode or on state at step 1402 in which the switch 502 transmits the input voltage 200 to the load 509 during a first portion of a first energy cycle of the output voltage 900. At step 1403, the controller 504 measures an energy parameter (e.g., voltage, current, power) of the output voltage 900 and accumulates a total amount of the energy parameter transmitted by the switch 502 during the first portion 901.

At step 1404, the total accumulated energy measured to the current time point is calculated by the controller 504 such as the RMS value of the total energy output by the switch assembly 501, and the accumulated energy is compared with a threshold value. If the threshold is not met 1405, the procedure 1400 returns to step 1403 to measure the transmitted energy at a subsequent time point. Steps 1403 and 1404 may be repeated until the threshold value is met 1406.

The controller 504 transmits a turn-off command to the switch 502 in response to determining that the total amount of energy to be transmitted during the positive voltage portion of the input voltage 200 is satisfied. However, as stated above, due to the load 1200 having an inductive nature, the energy flowing from the switch assembly 501 to the load 1200 is not immediately shut off. Accordingly, the procedure 1400 begins to measure the net energy (step 1408) still flowing through the switch assembly 501 to determine how much energy continues to flow after determining that the switch 502 should be turned off. If the energy is determined at step 1409 to be still flowing 1410, steps 1408 and 1409 are repeated until the energy is determined to be off 1411.

The net energy determined to flow through the switch assembly 501 after commanding the switches 502, 503 to turn off is used by the controller 504 in its future calculations to determine when to command the switches 502, 503 to turn off. For example, the controller 504 may determine that at a determined voltage value of the input voltage 200, a corresponding amount of net energy will continue to flow after sending the switch turn off signal. Accordingly, the controller 504 compares accumulated energy so far during the transmission of energy through a switch 502, 503 to the set-point threshold minus the expected net accumulation. As such, the controller 504 may command a switch 502, 503 to turn off at a time point prior to an accumulated energy reaching the threshold, leaving the remainder of energy to be transmitted to be supplied by the net energy.

In one example, the controller 504 generates a lookup table of net energies for various time points during the cycle for use in determining how much net energy will still flow after the turn off signal. Interpolation of the lookup table data may also be used for values between stored table data.

In another example, known values of the resistance and inductance parameters of the load 1200 are input by the controller 504 and used to calculate the net energy based on the equation:

$$I = I_{max}e^{-i\frac{R}{L}t}, \quad \text{(Eqn. 1)}$$

wherein $I_{max}$ is the current at a given time, R is the resistance of the load, L is the inductance of the load, and t is the time elapsed since sending the turn off signal. A sum of the currents calculated for various time values until the current becomes substantially zero can be used as the net energy value. In another example, the values of the resistance and inductance parameters of the load 1200 are unknown. The determination of the net value based on steps 1407-1411 can be used to determine an R/L value for Eqn. 1 for use in future calculations.

For subsequent energy cycles, the procedure 1400 detects the zero-cross point (step 1412), controls the switch (e.g., switch 502, 503) into a conduction mode (step 1413), and measures the accumulated transmitted energy through the switch assembly 501 (step 1414) as described in steps 1401-1403. At step 1415, the measured accumulated energy is compared with the set-point threshold based on taking a projected net accumulation value into account. For example, a current level of the output voltage 1300 at the time the step 1415 is performed may be used to obtain the projected net accumulation value from the lookup table or may be used to calculate the projected net accumulation value based on Eqn. 1. Step 1415 includes subtracting the projected net accumulation value from the threshold value to determine whether the measured accumulated energy passing so far through the switch assembly 501 is sufficient. If it is not sufficient (1416), steps 1414-1415 are repeated while the respective switch 502-503 remains in a conducting mode. In response to the measured accumulated energy plus the projected net accumulation value meeting the threshold requirement (1417), the controller 504 sends the command signal to the switch 502, 503 to turn off. The procedure 1400 may then return to step 1412 to begin another iteration of steps 1412-1418 for additional energy cycles.

Figure 15:
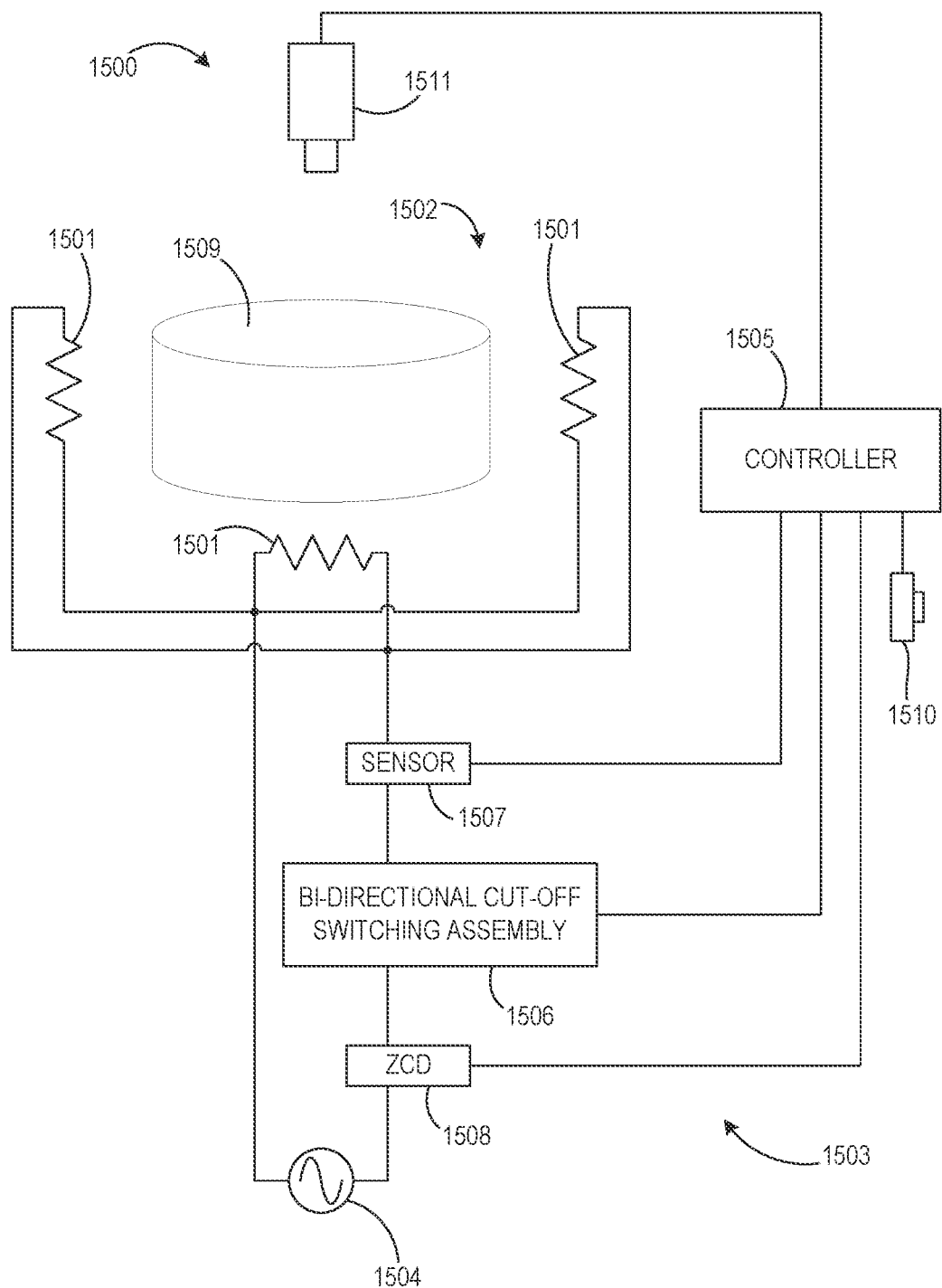
FIG. 15 illustrates a schematic diagram of a workpiece heating system incorporating aspects of this disclosure according to an example.

FIG. 15 illustrates a schematic diagram of a workpiece heating system 1500 according to an example. The system 1500 includes a plurality of heaters 1501 positioned to heat a workpiece area 1502. A power controller circuit 1503 is coupled between a voltage source 1504 and the heaters 1501. The power controller circuit 1503 includes a controller 1505 and a bi-directional cut-off switching assembly 1506 having one or more controllable switches. A sensor 1507 is positioned to sense the output energy from the switching assembly 1506, and a zero-crossing detector 1508 detects crossing points of the input voltage from the voltage source 1504 as it transitions between positive and negative values. During operation, the controller 1505 operates to control the switching assembly 1506 to deliver input power from the voltage source 1504 to the heaters 1501 sufficient to heat a workpiece 1509 to a temperature based on a temperature threshold set internally in the controller 1505 or set manually by a thermostat 1510.

To heat the workpiece 1509, the controller 1505 controls the switches of the switching assembly 1506 as described above in procedure 800 or procedure 1400. Based on the temperature of the workpiece 1509 obtained by a temperature sensor 1511, the set-point threshold compared with accumulated energy during execution of procedures 800 or 1400 may be increased or decreased. For example, for a workpiece 1509 having an initial temperature far away from the desired temperature set by the thermostat 1510, the set-point threshold may be a large value such that all or almost all of the input voltage during each energy cycle (e.g., 902, 909, 1101, 1106, 1302, etc.) is transmitted to the heaters 1501 so they radiate a high amount of heat toward the workpiece 1509. As the temperature of the workpiece 1509 approaches the temperature threshold, the set-point threshold may be reduced such that more and more of each energy cycle is cut-off in the manner described herein. Maintaining the temperature of the workpiece 1509 near the temperature threshold includes increasing or decreasing the set-point threshold based on the temperature of the workpiece 1509 being less than or greater than the temperature threshold, respectively.

Figure 16:
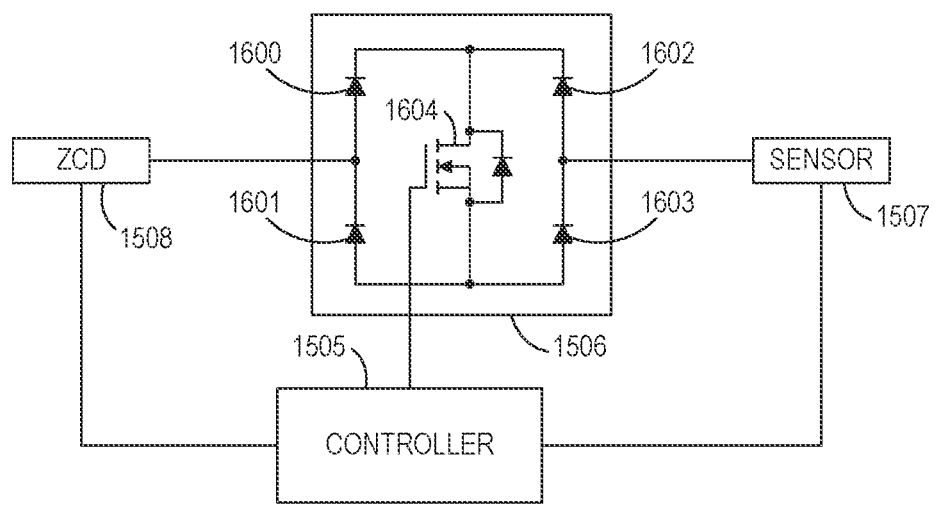
FIG. 16 illustrates a schematic diagram of a portion of the workpiece heating system of FIG. 15 according to an example.

The switching assembly 1506 may be a multi-switch assembly incorporating multiple controllable switches such as at least switches 502, 503 as described herein. Alternatively, the switching assembly 1506 may be a single-switch assembly having only a single controllable switch. FIG. 16 illustrates a portion of the system 1500 of FIG. 15 having a single controllable switch embodiment for the switching assembly 1506 according to an example. The switching assembly 1506 includes an array of diodes 1600-1603 coupled to a controllable switch 1604 such as a MOSFET (illustrated) or a BJT. During a positive energy cycle, energy flowing from the zero-crossing detector 1508 to the switching assembly 1506 may be transmitted through the switching assembly 1506 by controlling the controllable switch portion 1604 into its on state such that the energy is transmitted through the diode 1600, the controllable switch portion 1604, and the diode 1603 to the sensor 1507 and beyond as described above. During a negative energy cycle when the controllable switch portion 1604 is in its on state, the energy flows from the sensor 1507 and through the diode 1602, the controllable switch portion 1604, and the diode 1601 to the zero-crossing detector 1508 beyond as described above. The single-switch assembly 1506 illustrated in FIG. 16 may be further implemented as an alternative to any multi-switch assembly described herein such as switch assembly 501.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the present disclosure. Additionally, while various embodiments of the present disclosure have been described, it is to be understood that aspects of the present disclosure may include only some of the described embodiments. Accordingly, the invention is not to be seen as limited by the foregoing description but is only limited by the scope of the appended claims.

What is claimed is:

1. A power controller circuit for controlling energy supplied to a load, the power controller circuit comprising:
   a voltage input configured to receive electrical energy from a voltage source;
   a voltage output configured to transfer at least a portion of the electrical energy to the load;
   a bi-directional switching assembly coupled between the voltage input and the voltage output and comprising a first controllable switch;

a sensor coupled to the bi-directional switching assembly and configured to sense at least one energy parameter of an energy flowing through the bi-directional switching assembly; and a controller configured to:
control the first controllable switch into a conduction mode during a first portion of an energy cycle of the electrical energy to cause the energy to flow through the bi-directional switching assembly;
monitor, via the sensor, the at least one energy parameter of the energy flowing through the bi-directional switching assembly during the first portion; and
control the first controllable switch into a non-conduction mode based on a first amount of the at least one energy parameter of the energy flowing through the bi-directional switching assembly during the first portion;
wherein the flow of the energy through the bi-directional switching assembly is halted during a second portion of the energy cycle in response to controlling the first controllable switch into the non-conduction mode.

2. The power controller circuit of claim 1, further comprising a second controllable switch; and
wherein the controller is further configured to:
control the second controllable switch into a conduction mode during a third portion of the energy cycle to cause the energy to flow through the bi-directional switching assembly;
monitor, via the sensor, the at least one energy parameter of the energy flowing through the bi-directional switching assembly during the third portion; and
control the second controllable switch into a non-conduction mode based on a second amount of the at least one energy parameter of the energy flowing through the bi-directional switching assembly during the third portion;
wherein the flow of the energy through the bi-directional switching assembly is halted during a fourth portion of the energy cycle in response to controlling the second controllable switch into the non-conduction mode.

3. The power controller circuit of claim 1, wherein the at least one energy parameter comprises one of an electrical voltage, an electrical current, and an electrical power.

4. The power controller circuit of claim 1, wherein the electrical energy comprises AC electrical energy.

5. The power controller circuit of claim 4 further comprising a zero-crossing detector coupled to the voltage input and to the controller, the zero-crossing detector configured to detect a positive-to-negative transition of the AC electrical energy and a negative-to-positive transition of the AC electrical energy.

6. The power controller circuit of claim 5, wherein a start of the first portion of the energy cycle begins at one of the positive-to-negative transition and the negative-to-positive transition of the AC electrical energy.

7. The power controller circuit of claim 1, wherein the controller is further configured to:
monitor, via the sensor, a second amount of the at least one energy parameter of the energy flowing through the bi-directional switching assembly between the first portion and the second portion;
monitor, via the sensor, the at least one energy parameter of the energy flowing through the bi-directional switching assembly during a third portion of the energy cycle of the electrical energy, the third portion extending between the first portion of the energy cycle and the second portion of the energy cycle;
monitor, via the sensor, the at least one energy parameter of the energy flowing through the bi-directional switching assembly during a first portion of a subsequent energy cycle; and
control the first controllable switch into the non-conduction mode during first portion of the subsequent energy cycle based on the first amount monitored during first portion of the subsequent energy cycle and based on the second amount monitored during the third portion.

8. The power controller circuit of claim 7, wherein the third portion begins at a turn-off time at which the first controllable switch is controlled into the non-conduction mode; and
wherein the third portion ends at a flow-halt time at which the flow of the energy through the bi-directional switching assembly is halted.

9. The power controller circuit of claim 1, wherein the energy cycle comprises a positive voltage portion and a negative voltage portion.

10. The power controller circuit of claim 1, wherein the bi-directional switching assembly further comprises a diode assembly;
wherein in response to a positive flow of the electrical energy through the bi-directional switching assembly, the electrical energy is configured to flow through the first controllable switch and through a first pair of diodes of the diode assembly; and
wherein in response to a negative flow of the electrical energy through the bi-directional switching assembly, the electrical energy is configured to flow through the first controllable switch and through a second pair of diodes of the diode assembly, the second pair of diodes distinct from the first pair of diodes.

11. A method comprising:
receiving electrical energy from a voltage source, the electrical energy comprising a first energy cycle;
controlling a forward current switch of a switch assembly into an on-state during a forward current portion of the first energy cycle to transfer a first portion of the electrical energy to a load;
monitoring a parameter of the electrical energy flowing through the switch assembly during the on-state of the forward current switch;
comparing an accumulated amount of the parameter during the on-state of the forward current switch with a threshold;
in response to comparing the accumulated amount with the threshold, controlling the forward current switch into an off-state during the forward current portion of the first energy cycle;
wherein, in response to controlling the forward current switch into the off-state, the forward current portion is configured to prohibit the transfer of the first portion of the electrical energy to the load during a cut-off period of the forward current portion of the first energy cycle.

12. The method of claim 11 further comprising:
controlling a reverse current switch of the switch assembly into an on-state during a reverse current portion of the first energy cycle to transfer a second portion of the electrical energy to the load;
monitoring a parameter of the second portion of the electrical energy through the switch assembly during the on-state of the reverse current switch;

comparing an accumulated amount of the parameter of the second portion during the on-state of the reverse current switch with the threshold;

in response to comparing the accumulated amount of the parameter of the second portion with the threshold, controlling the reverse current switch into an off-state during the reverse current portion of the first energy cycle.

13. The method of claim 12 further comprising detecting a transition of the first energy cycle between the forward current portion and the reverse current portion.

14. The method of claim 13, wherein controlling the reverse current switch comprises controlling the reverse current switch into the on-state in response to detecting the transition.

15. The method of claim 14, wherein detecting the transition comprises detecting the transition via a zero-crossing detector.

16. The method of claim 12 wherein the first portion of the electrical energy flows through the switch assembly in a first direction; and wherein the second portion of the electrical energy flows through the switch assembly in a second direction opposite the first direction.

17. The method of claim 11, wherein controlling the forward current switch into the off-state comprises:

sending a command signal to the forward current switch, the command signal comprising a voltage value configured to cause the forward current switch to turn off;

monitoring the parameter flowing through the switch assembly after sending the command signal; and determining a net accumulation amount of the parameter continuing to flow during the forward current portion after sending the command signal.

18. The method of claim 17 further comprising:

controlling the forward current switch into the on-state during the forward current portion of a second energy cycle of the electrical energy to transfer a second portion of the electrical energy to the load;

monitoring the parameter of the second portion of the electrical energy flowing through the switch assembly;

at a first time point of the second energy cycle:

determining an accumulated value of an amount of the parameter transferred to the load between controlling the forward current switch into the on-state and the first time point;

determining a predicted net accumulation value of the parameter that would continue to flow to the load if the command signal were to be sent to the forward current switch at the first time point; and controlling the forward current switch into the off-state based on a relationship between a target threshold and a sum of the accumulated value and the predicted net accumulation value.

19. The method of claim 18, wherein the relationship comprises a value of the sum being greater than or equal to the target threshold.

20. The method of claim 11, wherein the forward current switch comprises one of a metal-oxide-semiconductor field-effect transistor (MOSFET) and a bipolar junction transistor (BJT).

* * * * *